United States Patent [19]

Medvetz

[11] Patent Number: 4,972,626
[45] Date of Patent: Nov. 27, 1990

[54] ANIMAL TRAP

[76] Inventor: Edward J. Medvetz, 220 Lincoln St., Homer City, Pa. 15748

[21] Appl. No.: 702,673

[22] Filed: Feb. 19, 1985

Related U.S. Application Data

[63] Continuation-in-part of Ser. No. 517,728, Jul. 27, 1983, abandoned.

[51] Int. Cl.$^5$ .............................................. A01M 23/26
[52] U.S. Cl. ............................................ 43/88; 43/92
[58] Field of Search ................... 43/88, 90, 91, 92, 93, 43/94, 95

[56] References Cited

U.S. PATENT DOCUMENTS

| | | | | |
|---|---|---|---|---|
| 440,336 | 11/1890 | Shaw | .................................... | 43/95 |
| 1,391,570 | 9/1921 | Nelsen | .................................... | 43/92 |
| 1,570,578 | 7/1926 | Schneider | .................................... | 43/88 |
| 2,020,153 | 11/1935 | Melvin | .................................... | 43/92 |
| 4,240,223 | 12/1980 | Medvetz | .................................... | 43/58 |
| 4,479,324 | 10/1984 | Askins | .................................... | 43/92 |

FOREIGN PATENT DOCUMENTS 579055  6/1933  Fed. Rep. of Germany .......... 43/94

Primary Examiner—Kurt Rowan
Attorney, Agent, or Firm—Webb, Burden Ziesenheim & Webb

[57] ABSTRACT

An animal trap having a frame, a pair of jaws rotatably mounted on the frame and a first spring on the frame to urge the jaws toward each other from the open position to the closed position. A pan is located between the jaws when the jaws are in the open position and is pivotally mounted on the frame. A dog is pivotally mounted on the frame and is adapted to contact the pan and hold the jaws in the open position. A notch is located at the free end of the dog and engages the end of the pan to hold the trap in the open position.

10 Claims, 3 Drawing Sheets

4,972,626

ANIMAL TRAP

CROSS-REFERENCE TO RELATED APPLICATION

This application is a continuation-in-part of application Ser. No. 517,728, filed Jul. 27, 1983, now abandoned.

FIELD OF THE INVENTION

The invention relates generally to pan-type animal traps and more particularly to animal traps which are trigerred by the weight of an animal on the trap pan.

DESCRIPTION OF THE PRIOR ART

A conventional pan-type animal trap has a finger-like extension on a pivotally mounted pan which engages with the end of a pivotally mounted latch lever or dog to hold the trap jaws open until a downward force is applied to the pan to rotate it and disengage the finger-like extension and the dog. Such traps are shown in U.S. Pat. Nos. 40,124; 125,449; 135,268; 642,476; 1,148,243; 1,243,588; 1,825,193; 1,886,203; 2,146,464; 2,201,307; 2,247,660; 2,316,970; 2,877,596, 3,939,596; 4,033,067; 4,184,282; and 4,266,364. U.S. Pat. No. 4,240,223, of which the present inventor is a patentee discloses a shear pin passing through a slot in the pan and a hole in the pivotally mounted dog to hold the pan in the set position. In the prior art traps it is difficult to regulate the trip weight and the pan creep.

Accordingly, it is an object of the present invention to provide a pan type animal trap wherein it is relatively easy to regulate both the trip weight and the pan creep.

Conventional animal traps have a pan which pivots about a single point on the trap frame. Such an arrangement provides a loose or sloppy mounting for the pan which permits the pan to wobble from side to side and may result in the trap being sprung prematurely.

It is another object of the present invention to provide a pantype animal trap wherein wobble of the pan is reduced or eliminated by substituting a different pan for the pan on an existing trap.

All leghold traps are attached to a stake or a grapple to prevent the trapped animal from escaping with the trap attached to its leg. Conventional traps usually include a hole or opening through an outside portion of the trap frame through which a chain or cable is secured. In such an arrangement, if an animal is caught between the jaws close to the chain attachment and the animal fights the trap, the part of the animal between the jaws may slide to the opposite side of the jaws causing unnecessary injury to the animal and possibly permitting the animal to escape.

It is a further object of the present invention to provide a pantype animal trap which may be secured to the ground or the like with little or no sliding or shifting of the animal across the jaws and, thus, reduce injury or escape of a trapped animal when it fights the trap.

SUMMARY OF THE INVENTION

The trap of the invention has a notch at the free end of the dog which engages the pan and holds the trap jaws in the set position. Preferably, the pan has a contact portion and a neck portion and the notch on the dog engages the end of the neck portion. In a trap which includes a U-shaped spring retainer to urge the trap jaws together, the pan is pivotally mounted on the U-shaped retainer. In a preferred embodiment of the invention, the trap has a bias spring for urging the pan upwardly to more positively engage the pan and the dog when the trap is set. The size and tension of the bias spring are selected to insure that the trap will not be sprung until a predetermined downward force is applied to the pan. In this regard, a shim may be inserted between the lower surface of the pan and the frame to prevent the pan from being depressed while it is handled in the set position. The invention also includes a cotter pin or the like extending through the bottom center portion of the trap frame to act as a swivel and enable a chain or the like to be attached to the trap.

DETAILED DESCRIPTION OF THE DRAWINGS

Figure 1:
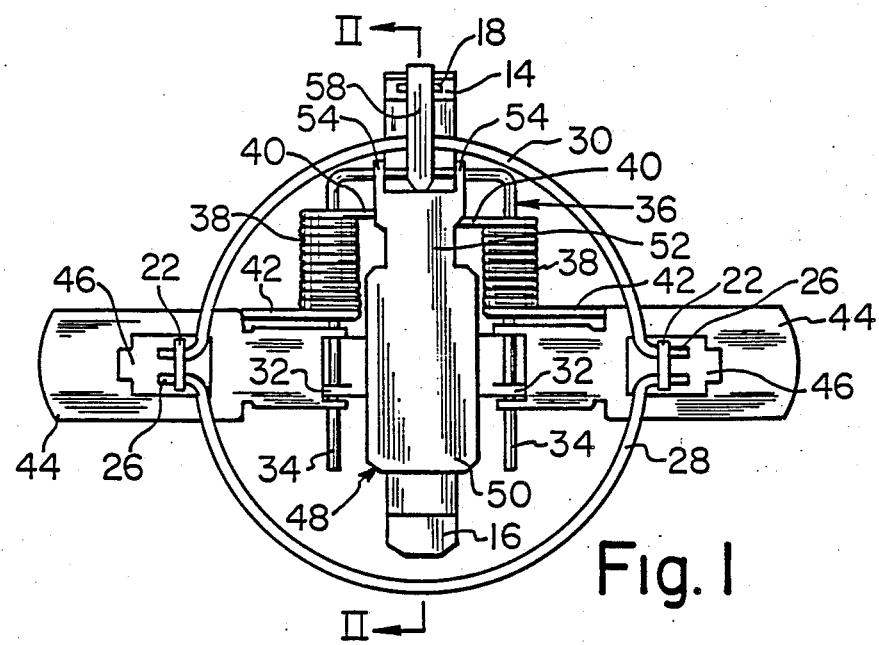
FIG. 1 is a plan view of one embodiment of the invention.

With specific reference to the drawings wherein like reference numerals indicate like elements in the various figures, one embodiment of a pan-type animal trap including the invention is shown in FIGS. 1 to 4. The trap comprises a frame 10 having a first frame member 12 with an upturned end 14 and a downturned end 16. The upturned end 14 is formed with an opening or slot 18 for a purpose to be described hereinafter. A second frame member 20 is welded at a right angle to the lower surface of the first frame member 12 and has opposed upturned ends 22. Each end 22 is formed with a pair of spaced openings 24 to rotatably receive extensions 26 at the opposite ends of curved jaws 28 and 30 of the trap. The second frame member 20 is also formed with a pair of inverted V-shaped punch outs 32 which form slots located on opposite sides of first frame member 12. The slots formed by punch outs 32 receive the ends of legs 34 of a U-shaped spring retainer 36 which is located above the first and second frame members 12 and 20. Each leg 34 of retainer 36 is surrounded by a coil spring 38. One end 40 of each coil spring 38 is located below and in contact with the bottom surface of the first frame member 12, and the other end 42 of each coil spring extends outwardly from the center of the trap parallel to the second frame member 20 and contacts the lower surface of an arm 44 which is pivotally mounted on a leg 34 of U-shaped spring retainer 36. The upper surface of each arm 44 contacts jaws 28 and 30 to rotate the jaws upwardly toward each other to trap an animal which triggers the trap by applying weight to the trap pan. Arms 44 are identical and each is formed with an enlarged opening 46 which embraces an upturned end 22 of the second frame member 20. The above described trap is a conventional pan-type trap which is well known in the art.

The invention includes the trigger arrangement which replaces the trigger arrangement on conventional traps. Trap pan 48 has a substantially rectangular contact portion 50 and a narrow neck portion 52. While a substantially rectangular contact portion is shown, it will be understood by those skilled in the art that the contact portion of the pan may have other configurations without departing from the invention. A pair of spaced lugs 54 extends downwardly from the lower surface of neck portion 52 of pan 48. Lugs 54 have aligned holes which permit the lugs 54 to be pivotally mounted on the cross member of spring retainer 36 which extends between legs 34. The pan 48 may be easily mounted on an existing trap by splitting the bottom end of lugs 54 and crimping the split ends of lugs 54 around the cross member of spring retainer 36. As shown in FIG. 1, the contact portion 50 of pan 48 is located between jaws 28 and 30 when the trap is in the set position. A dog 58 is pivotally mounted in opening 18 in the upturned end 14 of frame member 12 by an eye 60. The free end 61 of dog 58 is formed with a notch having a substantially vertical face 62 and an outwardly extending lower lip 64. When the trap is in the set position, dog 58 overlies jaw 30 to hold the jaws open and the vertical face 62 of the notch abuts against the end face 66 of the neck portion of pan 48. The upwardly directed force in the jaws in the set position causes jaw 30 to exert an upward force on the lower surface of dog 58 until lip 64 engages the bottom surface of neck portion 52 of pan 48. The lip 64 and vertical face 62 of the notch prevent further rotation of dog 58 and the trap remains in the set position.

Figure 2:
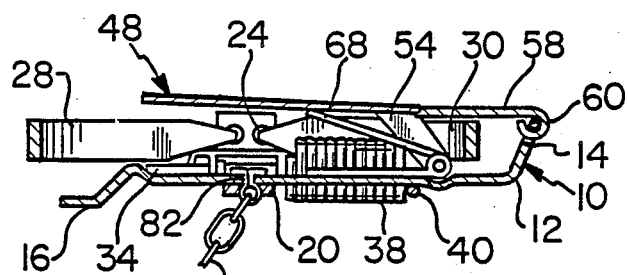
FIG. 2 is a vertical section on line II—II of FIG. 1.

As shown in FIGS. 1 and 2, the pivotal mounting for pan 48 on the base of U-shaped spring retainer 36 is located between a vertical plane in which pan 48 and dog 58 contact each other at faces 62 and 66 when the trap is in the set position and upturned end 14 of frame member 12. As a result, the contact point between the neck 52 of dog 58 and the pan 48 when the trap is set is located forwardly of the pivot point of the pan 48 in the direction of the center of the trap.

A spring may be provided to bias trap pan 48 upwardly. As shown in FIG. 2, a bias spring 68 is mounted around the cross member of spring retainer 36. Bias spring 68 includes a lower leg which is in contact with the upper surface of frame member 12 and an upper leg which is in contact with the lower surface of the trap pan. Bias spring 68 forces the pan to pivot upwardly about the corss member of the spring retainer and results in a positive engagement between the vertical face 62 of the notch at the free end 61 of dog 58 and the end face 66 of the neck portion 52 of the pan when the trap is in the set position.

When a downward force is applied to pan 48 by an animal, the pan tends to pivot in the downward direction about the cross member of the spring retainer, and if the weight of the animal on the pan is sufficient, the pan will rotate to a position in which the lip 64 of the notch is no longer in contact with the bottom surface of the pan and faces 62 and 66 disengage to permit dog 58 to rotate upwardly about eye 60 to release jaw 30 and the arms 44. Arms 44 are rotated upwardly by the legs 42 of coil springs 38 and rotate the jaws 28 and 30 to move the jaws toward each other to trap the animal which triggered the trap.

In setting the trap, the jaws are moved to their open position against the pressure of coil springs 38. The dog 58 is brought into position over jaw 30 with its free end 61 in line with the end of the neck portion 52 of pan 48. The upward force of jaw 30 and, if present, the upward force from bias spring 68 urges the lip 64 of the dog 58 up against the bottom surface of the pan 48 and urges end face 66 of pan 48 to abut the vertical face 62 of dog 58. The pan is then in the set position and the trap is ready for placement.

Figure 8:
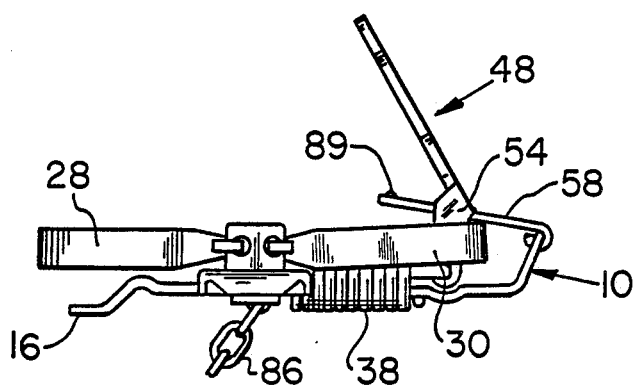
FIG. 8 is a side elevation of the trap in the preset position.

An important advantage of the trap of my invention will be appreciated from a consideration of FIG. 8 of the drawings wherein the trap is shown in the preset position. In this position, dog 58 extends between the spaced lugs 54 which pivotally mount pan 48 on the base of the U-shaped spring retainer 36. Because the dog is located below the pan 48, the upward force of the jaw 30 holds the dog tightly against the rear edge of the pan as shown in FIG. 8 without permitting the end of the dog to clear the rear edge of the pan. When the pan and dog are in the position shown in FIG. 8, the trap cannot be accidentally tripped, and hence the trap can be boiled, dyed, waxed, stored and transported to the trapping site. At the trapping site, the forward end of pan 48 is rotated downwardly so that the lugs pivot about the base of the spring retainer until the rear edge of the pan passes over the upset portion 89 on the dog at which point a click is heard and the rotation of the pan is immediately stopped and the trap is set. It will be appreciated by those skilled in the art that such is a safe way to transport the preset trap and a safe and easy method of setting the trap at the trap site. Also, substantial savings in both time and effort as well as less contamination of the traps and the trap sites are realized.

Figure 5:
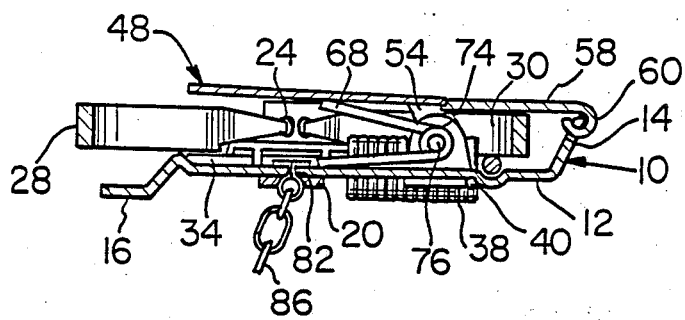
FIG. 5 is a vertical section showing a second embodiment of the invention.

An alternate arrangement for mounting trap pan 48 to the trap is shown in FIG. 5. A pair of spaced lugs 74 with aligned holes therethrough extends upwardly from frame member 12. The holes in lugs 54 extending downwardly from pan 48 are aligned with the holes in lugs 74 when the pan is in position on the trap frame 10. A bolt or pin 76 extends through the aligned holes in lugs 54 and 74 to pivotally mount the pan 48 to frame 10. This arrangement for mounting a pan to a trap frame is shown, in connection with a different trigger mechanism, in U.S. Pat. No. 4,240,223. If a bias spring 68 is included, it is mounted on bolt 76 and positioned between lugs 74.

Figure 6:
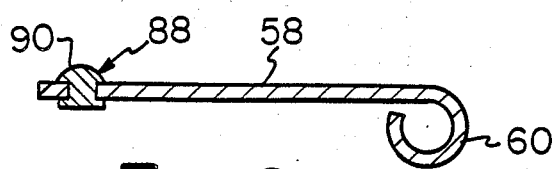
FIG. 6 is a vertical section through the dog showing a third embodiment of the invention.
Figure 9:
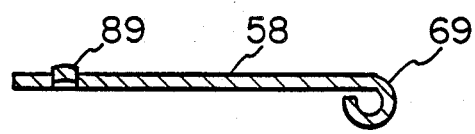
FIG. 9 is a vertical section through the dog showing a fourth embodiment of the invention.

The lip 64 on dog 58 may be formed by milling the free end 61 of the dog or by welding or otherwise securing a piece of metal to the upper surface of dog 58. An alternate method of forming the notch on the dog is shown in FIG. 6 wherein a rivet 88 is attached to the dog 58 near the free end 61 with rivet head 90 located on the upper surface of the dog so as to form a lip-type protrusion on the upper surface of the dog. A second alternate method of forming the notch on the dog is shown in FIG. 9 wherein the dog is upset or partially punched at 89. The slug which is raised above the surface of the dog forms a lip-like protrusion on the upper surface of the dog.

Traps with the trigger arrangements discussed above have both an exact set point and an exact trip point which are advantages over conventional traps. Contacts between the dog and pan is necessary to set the trap as in conventional traps, but the spring bias exerts an upward force holding lip 64 on the end of dog against the lower surface of the pan which makes it less likely that the trap will be accidentally sprung. Also a click sound is heard when the pan and the dog reach the final set position, and this is advantageous when conditions prohibit good visibility such as in early morning and late afternoon. The use of the pan mounting arrangement with the widely spaced lugs 54 on the pan shown in FIGS. 1 and 2 is particularly advantageous because the relatively wide spacing between the two pivot points for lugs 54, when compared with a single or closely spaced pivot points in conventional traps, results in a stable pan which substantially reduces pan wobble. This helps to prevent the trap from being accidentally sprung. Additionally, mounting lugs 54 on the cross member of retainer 36 eliminates the pan post and the cost of forming and installing it.

If a bias spring 68 is used to force the pan upwardly, the animal must exert a sufficient force to overcome the spring before the trap will be triggered. The tension on the bias spring 68 can be varied by using springs having different sizes and tensions in order to only trap animals over a certain weight. If the animal is too small, its weight will be insufficient to overcome the tension of the bias spring and the animal will not spring the trap. This is an important advantage in protecting lightweight animals and birds. As well as excluding nontarget animals, the set traps will remain operable for target species. In this regard, the savings in time and effort required to locate nontarget animals, dispose of carcasses or release an animal and reset the traps is substantial. When nontarget animals are taken in areas where there are trap-shy animals, many trap sets may have to be relocated and the used traps must be cleaned or replaces.

Figure 3:
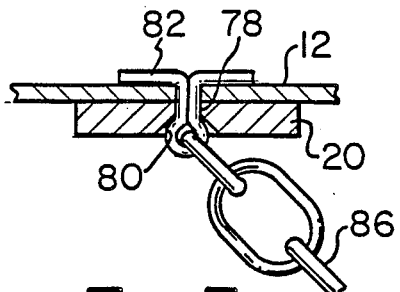
FIG. 3 is an enlarged section of the chain swivel arrangement shown in FIG. 2.
Figure 4:
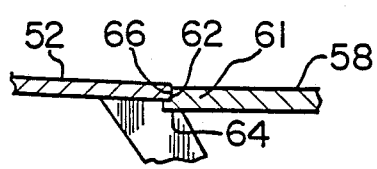
FIG. 4 is an enlarged section of the engaged pan and dog shown in FIG. 2.
Figure 7:
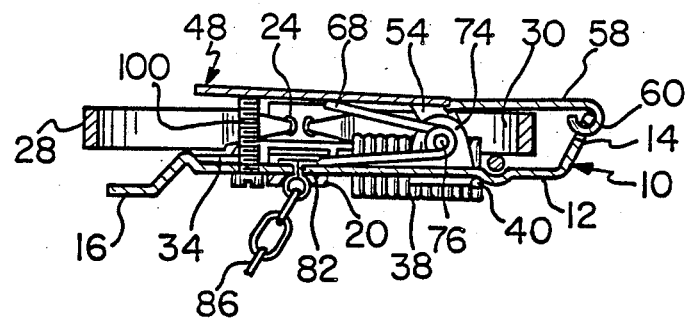
FIG. 7 is a vertical section of a modification of the traps shown in FIGS. 1, 2 and 5.

A means for attaching the trap to a tree or to a stake by a cable or the like and a center swivel is shown in FIGS. 2, 5 and 7 and is shown in detail in FIG. 3. An opening 78 is provided through the frame near the center in the area where the first frame member 12 and the second frame member 20 overlap. The bottom of opening 78 is provided with a bevel or chamfer 80. A cotter pin or the like 82 is attached to the frame with the closed end located partly or completely within the bevel 80. A chain or cable 86 is attached to the closed end of cotter pin 82. Cotter pin 82 forms a swivel permitting rotation of the attached end of the chain through a full 360°. By locating the connection means in the bottom of the frame near its center, there is less possibility for an animal to slide between the trap jaws when it fights the trap. This reduces injury to the animal and reduces the possibility of escape.

FIG. 7 of the drawings shows an arrangement which includes a bolt 100 extending upwardly through a threaded hole in frame member 12 to contact the lower surface of pan 48 when the pan and dog 58 are in the set position. The advantages of this arrangement make it possible to set a trap and then handle it in the set position for boiling, dyeing, waxing, transportion and the like without fear that the trap will accidentally be sprung. When the trap is to be in the field, the bolt 100 is sheared with cutting pliers adjacent to the upper surface of frame member 12 or unscrewed with a screwdriver and the trap is ready for operation. While a removable bolt 100 is shown, it will be understood by those skilled in the art that any removable shim means may be used between the lower surface of pan 48 and the upper surface of frame member 12.

While preferred embodiments of the invention have been shown and described, it will be understood that the invention may be otherwise embodied within the scope of the appended claims.

I claim:
1. An animal trap having
  A. a frame,
  B. a pair of jaws pivotally mounted on said frame for movement between an open position and a closed position,
    1. one of said jaws being a free jaw and
    2. the other of said jaws being a controlled jaw,
  C. a substantially U-shaped spring retainer mounted on said frame, said spring retainer having
    1. parallel legs and
    2. a base connecting said parallel legs,
  D. a closing means pivotally mounted on each leg of said spring retainer for closing said jaws,
  E. a coil spring mounted on each leg of said spring retainer in contact with the closing means mounted on said leg to urge said closing means upwardly to move said jaws toward each other into the closed position,
  F. a pan located between said jaws when said jaws are in the open position, said pan having
    1. a pair of spaced substantially parallel lugs extending downwardly and rearwardly at an obtuse angle from one end and the free end of each of said lugs being pivotally attached to the base of said spring retainer to pivotally mount said pan directly on said spring retainer and
    2. a vertical face on the end from which said spaced lugs extend,
  G. a dog adapted to contact the end of said pan from which said spaced lugs extend and overlying said controlled jaw when the jaw is in the open position to hold said controlled jaw in the open position, said dog having
    1. a first end pivotally mounted on said frame and
    2. a second free end formed with a notch, said notch providing a horizontal lip adapted to engage the bottom surface of the end of said pan from which said spaced lugs extend and a vertical face located above said lip adapted to engage said vertical face on the end of said pan from which said spaced lugs extend so that contact between said second free end of said dog and the end of said pan from which said spaced lugs extend holds said controlled jaw in the open position and
  H. the pivotal attachment between the free end of each of said spaced lugs and the base of said spring retainer being located between said first end of said dog mounted on said frame and said second free end of said dog when said jaws are in the open position.

2. An animal trap as set forth in claim 1 wherein said notch is a substantially right angle step at said second free end of said dog.

3. An animal trap as set forth in claim 1 wherein said notch is formed by an upstanding slug on the upper surface of said dog adjacent to said second free end of said dog.

4. An animal trap as set forth in claim 1 wherein said notch is formed by a rivet attached to said dog adjacent said second free end of said dog and having a head adjacent the upper surface of said dog, and wherein said lip is the portion of the upper surface of said second free end of said dog which extends beyond said rivet head.

5. An animal trap as set forth in claim 1 wherein the lower end of each of said spaced parallel lugs extending downwardly at an angle from one end of said pan has a hole formed therein, and the base of said spring retainer passes through said holes to pivotally mounted said lugs directly on the base of said spring retainer.

6. An animal trap having
   A. frame,
   B. a pair of jaws pivotally mounted on said frame for movement between an open position and a closed position,
      1. one of said jaws being a free jaw and
      2. the other of said jaws being a controlled jaw,
   C. a substantially U-shaped spring retainer having
      1. parallel legs mounted on said frame and
      2. a base connecting said parallel legs,
   D. a closing means pivotally mounted on each leg of said spring retainer to close said jaws,
   E. a coil spring mounted on each leg of said spring retainer to urge said closing means upwardly to move said jaws toward each other from the open position into the closed position,
   F. a pan located between said jaws when said jaws are in the open position,
   G. a pair of spaced substantially parallel lugs having upper ends attached to one end of said pan and extending downwardly and rearwardly at an obtuse angle from said pan and having the lower ends pivotally attached to said base of said spring retainer to pivotally mount said pan directly on said spring retainer and
   H. a vertical face on the end of said pan from which said spaced lugs extend,
   I. a dog having
      1. a first end pivotally mounted on said frame,
      2. a second free end adapted to contact the end of said pan from which said spaced lugs extend to hold said controlled jaw in the open position and
      3. means on said second free end of said dog adapted to engage the end of said pan from which said spaced lugs extend so that contact between said means on said second free end of said dog and the end of said pan from which said spaced lugs extend holds said controlled jaw in the open position, and
   J. the attachment between the lower ends of said spaced lugs and the base of said spring retainer being located between said first end of said dog pivotally mounted on said frame and said second end of said dog when said jaws are in the open position.

7. In an animal trap having a frame, a pair of jaws pivotally mounted on said frame, a substantially U-shaped spring retainer having parallel legs mounted on said frame and a base connecting said parallel legs, a closing means pivotally mounted on each leg of said spring retainer for closing said jaws, a coil spring mounted on each leg of said spring retainer in contact with the closing means to urge said closing means upwardly to move said jaws toward each other from the open position into the closed position, a pan located between said jaws when said jaws are in the open position and a dog having a first end pivotally mounted on said frame and a second free end, said dog overlying one of said jaws when the jaw is in the open position to hold said jaw in the open position, the improvement comprising.
   A. a pair of spaced substantially parallel lugs having one end attached to one end of said pan and extending downwardly and rearwardly at an obtuse angle from said pan and the other end of each of said lugs being pivotally attached to the base of said spring retainer to pivotally mount said lugs and said pan directly on said spring retainer.
   B. a vertical face on the end of said pan from which said spaced lugs extend,
   C. a notch formed on said second free end of said dog, said notch having a horizontal lip adapted to engage the bottom surface of the end of said pan from which said spaced lugs extend and a vertical face located above said lip adapted to engage the end of said pan from which said spaced lugs extend so that contact between said notch on said dog and the end of said pan from which said spaced lugs extend holds said one jaw in the open position and
   D. the pivotal attachment between the lower end of each of said spaced lugs and the base of said spring retainer being located between the pivotal mounting of said first end of said dog on said frame and said second free end of said dog when said jaws are in the open position.

8. In an animal trap as set forth in claim 27, said notch being a substantially right angle step at said free end of said dog.

9. In an animal trap as set forth in claim 7, said notch being formed by an upstanding slug on the upper surface of said dog adjacent to said second free end of said dog.

10. In an animal trap as set forth in claim 7, said notch being formed by a rivet attached to said dog adjacent said second free end of said dog, said rivet having a head adjacent the upper surface of said dog, wherein said lip comprises the portion of the upper surface of said second free end of said dog between said rivet head and said second free end of said dog.

* * * * *